(12) United States Patent
Hernandez et al.

(10) Patent No.: US 10,003,235 B2
(45) Date of Patent: Jun. 19, 2018

(54) FLEXIBLE CONNECTOR SYSTEM FOR CONNECTING A HIGH CURRENT MOTOR TO A PCB OF AN INTEGRATED ELECTRONICS SYSTEM OF A VEHICLE

(71) Applicant: Continental Automotive Systems, Inc., Auburn Hills, MI (US)

(72) Inventors: Irving U. Hernandez, Palatine, IL (US); Hyun Sung Choi, Lake Zurich, IL (US); Vincent Lawrence, Arlington Heights, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 685 days.

(21) Appl. No.: 14/552,514

(22) Filed: Nov. 25, 2014

(65) Prior Publication Data
US 2015/0194857 A1  Jul. 9, 2015

Related U.S. Application Data

(60) Provisional application No. 61/924,878, filed on Jan. 8, 2014.

(51) Int. Cl.
| | |
|---|---|
| *H02K 11/00* | (2016.01) |
| *H02K 37/24* | (2006.01) |
| *H02K 7/10* | (2006.01) |
| *H02K 5/22* | (2006.01) |
| *H02K 15/14* | (2006.01) |
| *H02K 11/33* | (2016.01) |

(52) U.S. Cl.
CPC ............ *H02K 5/225* (2013.01); *H02K 11/33* (2016.01); *H02K 15/14* (2013.01); *Y10T 29/49117* (2015.01)

(58) Field of Classification Search
CPC .................................. H02K 11/01; H02K 5/25
USPC ........................... 310/48, 68 D, 75 R, 98, 71
See application file for complete search history.

(56) References Cited

U.S. PATENT DOCUMENTS

| | | | |
|---|---|---|---|
| 5,343,970 A | * | 9/1994 | Severinsky ............ B60K 6/387 180/165 |
| 6,224,169 B1 | | 5/2001 | Aoki et al. |
| | | | (Continued) |

FOREIGN PATENT DOCUMENTS

| | | |
|---|---|---|
| CN | 1578018 A | 2/2005 |
| CN | 1898848 A | 1/2007 |
| | (Continued) | |

OTHER PUBLICATIONS

Corresponding English translation of Chinese Office Action dated Oct. 9, 2016.

(Continued)

*Primary Examiner* — Jose Gonzalez Quinone

(57) ABSTRACT

An integrated electronics system for a vehicle includes a housing, a circuit board mounted to the housing, at least one circuit board electrical terminal fixed to the circuit board and extending therefrom and an electric motor having windings. At least one motor electrical terminal is connected to the circuit board electrical terminal. A flexible wire is electrically connected between the windings and the at least one motor electrical terminal so as to permit the at least one motor electrical terminal to move with respect to different axes when being coupled to the at least one circuit board electrical terminal.

3 Claims, 2 Drawing Sheets

(56) References Cited

U.S. PATENT DOCUMENTS

| | | | |
|---|---|---|---|
| 2002/0151197 A1 | 10/2002 | Kawakita et al. | |
| 2010/0170294 A1* | 7/2010 | Nakagami | F04C 23/008 62/505 |
| 2010/0308700 A1 | 12/2010 | Isoda et al. | |
| 2011/0316373 A1* | 12/2011 | Kobayashi | H01R 9/24 310/71 |

FOREIGN PATENT DOCUMENTS

| | | | | |
|---|---|---|---|---|
| CN | 101896724 A | 4/2013 | | |
| DE | 19616077 A1 | 4/1997 | | |
| DE | 19849267 A1 | 4/2000 | | |
| DE | 202010006891 U1 | 10/2010 | | |
| EP | 0921048 A2 * | 6/1999 | | B60T 8/368 |
| EP | 921048 A2 | 6/1999 | | |
| JP | H1116527 A | 1/1999 | | |
| JP | H11165627 A | 6/1999 | | |
| JP | 2009-207310 A | 9/2009 | | |
| JP | 2009207310 A | 9/2009 | | |
| JP | 2010-283997 A | 12/2010 | | |
| WO | 200039910 A1 | 7/2000 | | |

OTHER PUBLICATIONS

German Office Action dated Oct. 24, 2017 for corresponding German Application No. 10 2014 225 160.0.
Korean Office Action dated Sep. 4, 2017 for corresponding Korean Application No. 10-2016-0130083.

* cited by examiner

FLEXIBLE CONNECTOR SYSTEM FOR CONNECTING A HIGH CURRENT MOTOR TO A PCB OF AN INTEGRATED ELECTRONICS SYSTEM OF A VEHICLE

This application claims the benefit, for priority purposes, of U.S. Provisional Application No. 61/924,878, filed on Jan. 8, 2014, the content of which is hereby incorporated by reference into this specification.

FIELD

The invention relates generally to a flexible connector system and, more particularly to a flexible connector system for high current AC motor applications that reduces or eliminates tolerance issues between terminals associated with the motor and terminals fixed on a circuit board.

BACKGROUND

With reference to FIG. 1, a cross-section of a conventional integrated electronics system is shown, generally indicted at 10, having a three-phase brushless DC motor 12. The system 10 includes a flexible connector 14 making electrical connection between the motor 12 and a connector 15 on a printed circuit board (PCB) 17. The flexible connector does accommodate tolerances of the electric connection with the connection 15, but this system 10 has lower rated current and uses small gage wire and thus cannot be employed with high current (e.g., 50 A) AC motors for use in a vehicle. Also, there is very limited movement of the flexible connector 14 to accommodate tolerances.

In addition, the terminals 16 on the conventional brushless DC motor 12 are part of the motor winding 18, making it easier to connect motor winding wires to the female terminal 19. Such a configuration cannot be applied to high current AC motors since these motors require thicker wire windings and the motor terminal location is on the motor housing, not near the motor winding.

Accordingly, there exists a need for a flexible connector system for electrically connecting terminals associated with high current motors to a fixed terminals on circuit board of an integrated electronics system of a vehicle.

SUMMARY

An objective of the present invention is to fulfill the need referred to above. In accordance with the principles of an embodiment, this objective is obtained by an integrated electronics system for a vehicle that includes a housing, a circuit board mounted to the housing, at least one circuit board electrical terminal fixed to the circuit board and extending therefrom, and an electric motor having windings. At least one motor electrical terminal is connected to the circuit board electrical terminal. A flexible wire is electrically connected between the windings and the at least one motor electrical terminal so as to permit the at least one motor electrical terminal to move with respect to different axes when being coupled to the at least one circuit board electrical terminal.

In accordance with another aspect of the embodiment, a method is provided for electrically connecting a motor to circuit board of an integrated electronics system for a vehicle. The circuit board includes at least one circuit board electrical terminal fixed to the circuit board and extending therefrom. The method provides at least one flexible wire electrically connected between windings of the motor and a motor electrical terminal. The motor electrical terminal is moved with respect to the fixed circuit board electrical terminal so as to align therewith. The motor electrical terminal is then connected to the fixed circuit board electrical terminal.

Other objectives, features and characteristics of the embodiments, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

The following description of the preferred embodiment(s) is merely exemplary in nature and is in no way intended to limit the invention, its application, or uses.

Figure 2:
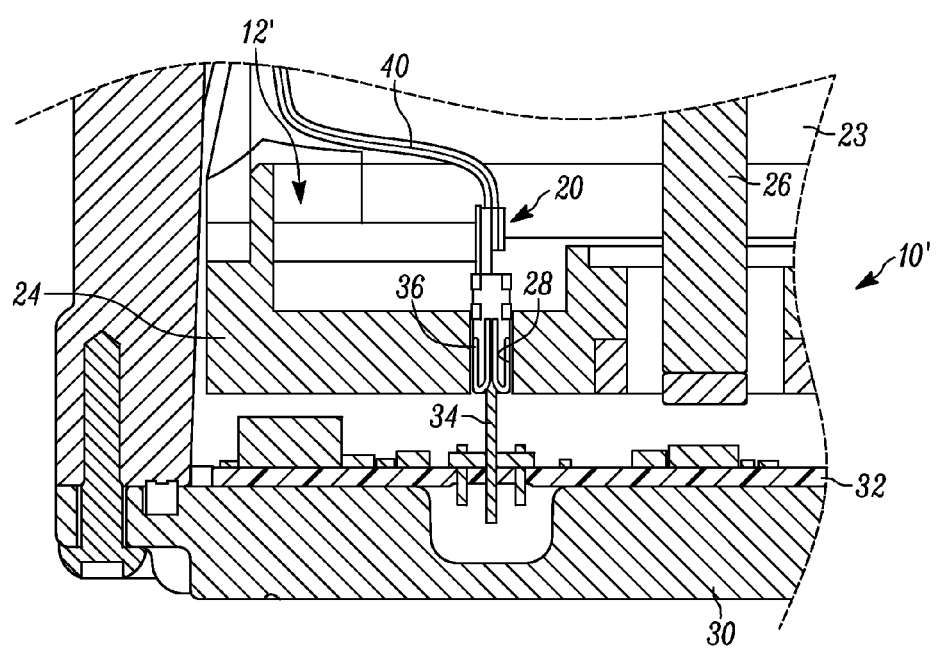
FIG. 2 is a sectional view of portion of an integrated electronics system having AC electric motor with a flexible connector system, in accordance with an embodiment.
Figure 3:
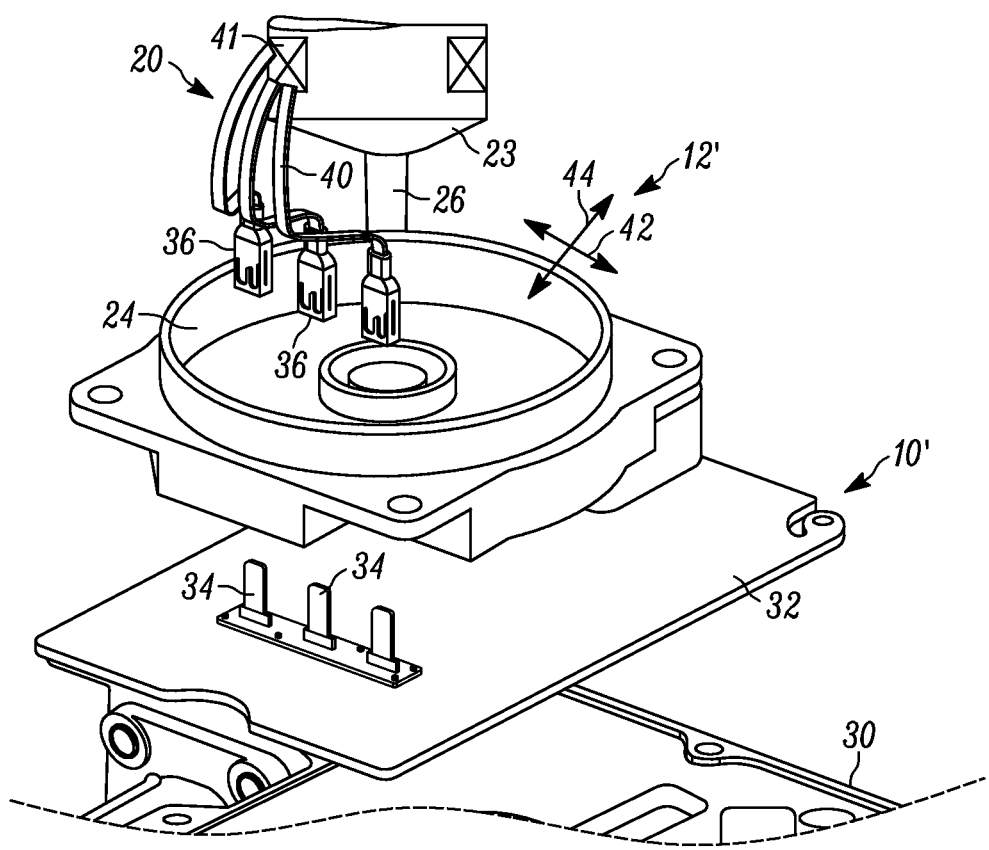
FIG. 3 is an exploded view of the portion of the integrated electronics system of FIG. 2.

With reference to FIG. 2, a portion of a vehicle's integrated electronics system is shown, generally indicated at 10'. The system 10' can be, for example, an electric clutch actuator system. The system 10' includes an AC electric motor assembly, shown generally indicated at 12', which has a flexible connector system, generally indicated at 20, in accordance with an embodiment. The motor assembly 12' includes a motor 23 that is preferably a high current (such as 50 Amps) three-phase AC motor. The motor assembly 12' with the flexible connector system 20 is also suitable for other high current three-phase AC motor applications having integrated electronics systems, such as electric power steering, electric oil pump, and electronics limited slip differential systems.

Figure 1:
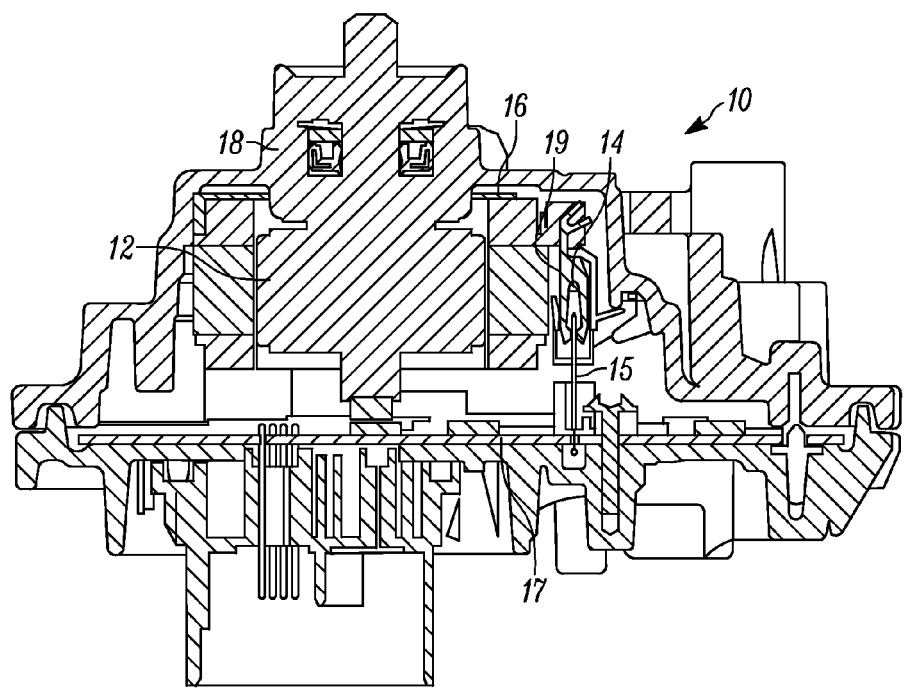
FIG. 1 is a cross-section of a conventional integrated electronics system having a three-phase brushless DC motor and a flexible connector.

The motor assembly 12' includes a body 24 that receives a rotatable shaft 26 of the electric motor 23. The body 24 is associated with a housing 30 of the electronics system 10'. A printed circuit board (PCB) 32 is mounted to the housing 30 of the electronics system and is generally adjacent to the body 24. The PCB 32 includes at least one male, circuit board electrical terminal 34 fixed to the PCB 32 and extending therefrom and into the aperture 28 of the body 24 (FIG. 1). Three terminals 34 are shown in the embodiment, but more or less can be provided, depending on the application.

The flexible connector system 20 comprises at least one female, motor electrical terminal 36 disposed through an aperture 28 in the body 24 so as to receive the male terminal 34. In the embodiment, three female terminals 36 are provided, with each terminal 36 mating with an associated male terminal 34. Each female terminal 36 is connected to a flexible braided mesh wire 40 that is electrically connected directly or indirectly to windings 41 of the motor 23. Due to the flexible braided mesh wire 40, each female terminal 36 is able to be moved, or to "float," along a first axis 42 (e.g. X axis) and a second axis 44 (e.g., Y axis) within the corresponding aperture 28 so as to align the female terminal 36 with respect to the associated male terminal 34. During assembly, the female terminal 36 receives (is connected with) an associated male terminal 34, and due to the ability for each female terminal 36 to move along each axis 42, 44, tolerances of the fixed male terminal 34 in the X and Y direction can be accommodated. The float in the X and Y directions is required for the assembly processes, when blind mating the motor 23 to the integrated electronics system 10' is performed. In addition, the float of the female terminal 36 also provides stress relief to the solder joints on the male terminal 34.

The braided mesh wire 40 enables high current AC motor applications and provides the flexibility to the connected female terminal 36. The current rating of the wire 40 and of the female terminal 36 is specifically chosen to be substantially equal to the current rating of the motor 23. Although, in the embodiment, the female terminal 36 is connected to the wire 40, it can be appreciated that the wire 40 can be connected to a male connector 34, with the PCB 32 including a mating, fixed female terminal 36.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An integrated electronics system for a vehicle, comprising:
    a housing,
    a circuit board mounted to the housing,
    at least one circuit board electrical terminal fixed to the circuit board and extending therefrom,
    an electric motor having windings, the electric motor includes a three-phase AC motor having current rating of about 50 Amps,
    at least one motor electrical terminal connected to the circuit board electrical terminal,
    a body generally adjacent to the circuit board, the body defining at least one aperture there-through, the at least one motor electrical terminal mating with the at least one circuit board electrical terminal within the at least one aperture, and
    a flexible wire including a braided mesh, the flexible wire electrically connected between the windings and the at least one motor electrical terminal through the at least one aperture so as to permit the at least one motor electrical terminal to move with respect to different axes when being coupled to the at least one circuit board electrical terminal.

2. The system of claim 1, wherein the at least one circuit board electrical terminal is a male terminal and the at least one motor electrical terminal is a female terminal.

3. The system of claim 1, wherein three motor electrical terminals are provided, each mating with an associated circuit board electrical terminal.

* * * * *